United States Patent [19]

Alston et al.

[11] Patent Number: 4,647,975
[45] Date of Patent: Mar. 3, 1987

[54] EXPOSURE CONTROL SYSTEM FOR AN ELECTRONIC IMAGING CAMERA HAVING INCREASED DYNAMIC RANGE

[75] Inventors: Lawrence E. Alston, Chelmsford; Donald S. Levinstone, Cambridge; William T. Plummer, Concord, all of Mass.

[73] Assignee: Polaroid Corporation, Cambridge, Mass.

[21] Appl. No.: 792,768

[22] Filed: Oct. 30, 1985

[51] Int. Cl.[4] .............................................. H04N 9/79
[52] U.S. Cl. .................................... 358/213; 358/209
[58] Field of Search ............... 358/909, 213, 212, 228, 358/209; 354/209, 415

[56] References Cited

U.S. PATENT DOCUMENTS 4,263,623  4/1981  Woo et al. ........................... 358/909
4,541,016  9/1985  Ochi et al. ........................... 358/909

FOREIGN PATENT DOCUMENTS 0102030  3/1984  European Pat. Off. .

OTHER PUBLICATIONS

"Mannheim's World", by L. Andrew Mannehim,. Photo World, Sep. 1984, p. 32.
"Wide-Brightness-Range Video Camera", NASA Tech. Briefs, Fall 1985.
Research Disclosure, Mar. 1984, p. 92.
"Video Signal Processing Improves SNR", Electronic Imaging, Mar. 1983, p. 36.

Primary Examiner—Gene Z. Rubinson
Assistant Examiner—Stephen Brinich
Attorney, Agent, or Firm—Edward S. Roman

[57] ABSTRACT

An electronic imaging camera is provided with a substantially expanded dynamic exposure range by implementing two succeeding exposure intervals under conditions where the exposure defining parameters are substantially different and thereafter selectively choosing between the electronic information signals sensed during the two succeeding exposure intervals to provide an output signal from which a visible image of the subject may be reconstructed thereafter.

22 Claims, 12 Drawing Figures

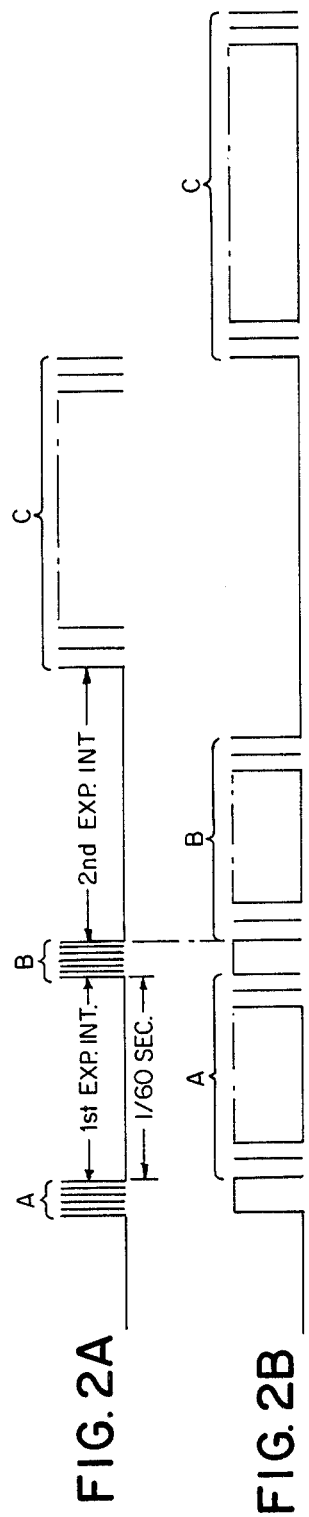
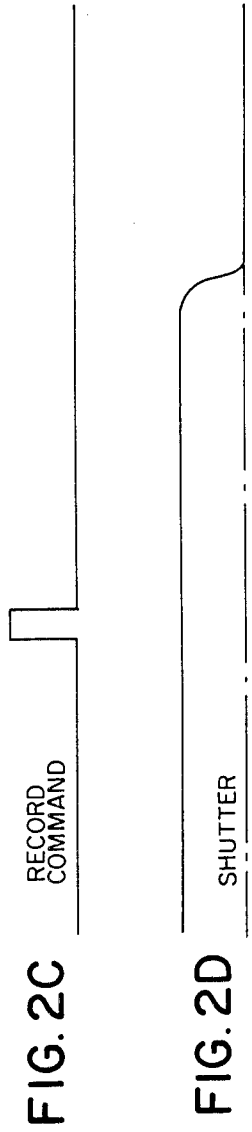

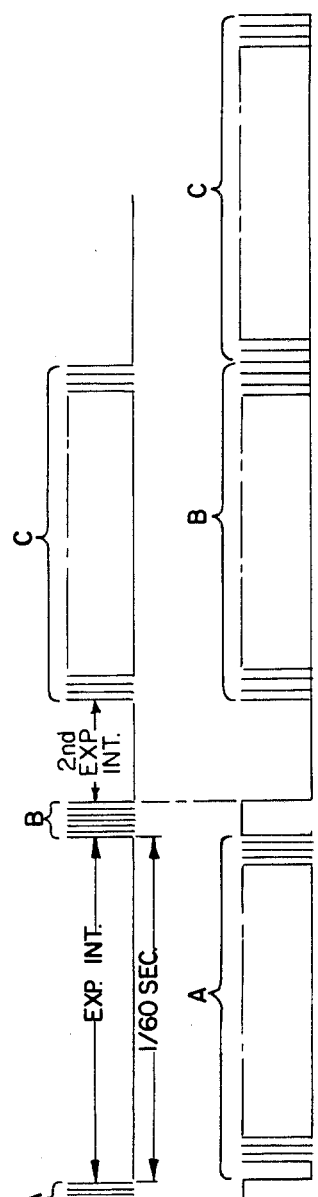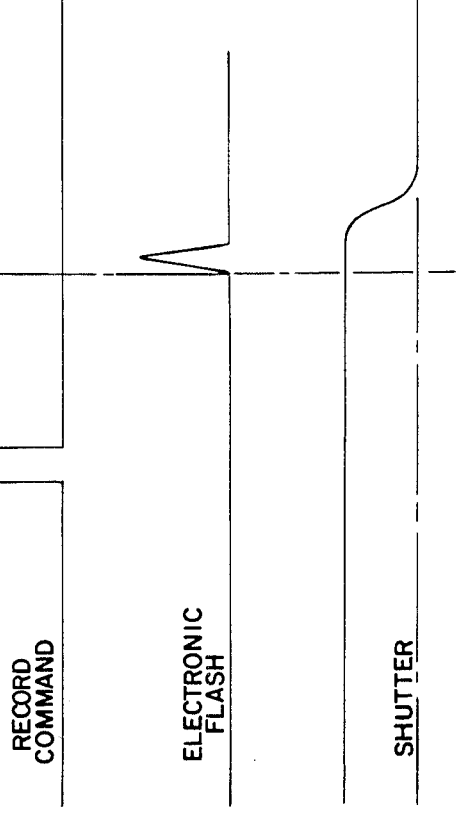

EXPOSURE CONTROL SYSTEM FOR AN ELECTRONIC IMAGING CAMERA HAVING INCREASED DYNAMIC RANGE

BACKGROUND OF THE INVENTION

1. Field of the Invention

This invention relates generally to an electronic imaging camera with increased dynamic range and, more particularly, to an electronic imaging camera in which the effective dynamic range of the light detecting array is substantially increased.

2. Description of the Prior Art

Electronic imaging cameras for recording still images are well known in the art. Such cameras can record a plurality of still images on a single magnetic disk or tape in either analog or digital format for subsequent playback on any well-known cathode ray tube (CRT) viewing device. Printers may also be utilized with such cameras in a well-known manner to provide hard copy of the recorded images. Such electronic imaging still cameras may also utilize two-dimensional image light sensing arrays such as charge coupled devices (CCD's) which integrate incident scene light over a predetermined time to provide an electronic information signal corresponding to the scene light intensities incident to the array.

Electronic imaging cameras of the aforementioned type also commonly employ electronic viewfinders where the scene is sensed in ambient scene light by the image sensing array at standard video rates, where each field is sensed for 1/60th of a second. Thus, the incident scene light for each frame is integrated for 1/60th of a second to provide the video electronic information signal to the electronic viewfinder display. High resolution solid state image sensing devices such as the aforementioned charge coupled device have relatively limited dynamic exposure ranges resulting from the individual picture elements or pixels of the charge coupled device saturating under conditions of high intensity incident scene illumination and incurring low signal to noise ratios under conditions of low intensity incident scene illumination. The dynamic exposure range for such solid state image sensing arrays is quite limited and substantially less than the dynamic exposure range of most photographic films. Thus, full advantage cannot be taken of the wide dynamic illumination range of typical outdoor scenes in view of the limited dynamic exposure range of the image sensing array.

In addition such cameras may also use an electronic flash to provide full artificial illumination under conditions of low ambient scene light, or partial fill-in artificial illumination under conditions of high ambient scene light intensity where the subject may be backlit or shadowed. Under conditions where an electronic flash is utilized to provide supplemental illumination to fill in and properly expose a central subject, the reflected artificial illumination is ordinarily sensed by a photodetector control circuit to terminate the light integration when the central subject is properly exposed. This exposure time may not be sufficient to properly expose the background, particularly outdoors where the background of the scene is likely to be located far beyond the range of the electronic flash. However, since the exposure times during the aforementioned preview mode of operation are at standard video rates, the background of the scene may be better exposed than during the shorter period of light integration as occurs during the firing of a flash of artificial illumination as a result of the rapid falloff of the flash illumination with increasing distance.

Therefore, it is a primary object of this invention to provide an electronic imaging still camera in which the effective dynamic exposure range of the image sensing array is substantially expanded.

It is a further object of this invention to provide an electronic imaging camera in which the dynamic exposure range of the image sensing array is substantially expanded by discriminating between the electronic information signals derived from at least two successive exposure intervals defined by different exposure limiting parameters.

It is an even further object of this invention to provide an electronic imaging still camera in which the electronic information signal ultimately recorded corresponding to a desired scene is derived as a function of two different succeeding exposure intervals.

It is an even further object of this invention to provide an electronic imaging still camera in which a still image is ultimately recorded as a function of the scene light detected during a first exposure interval in which the scene light is not artificially illuminated and a second exposure interval illuminated by a flash of artificial illumination.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

An electronic imaging camera includes an image sensing array comprising a predetermined number of discrete image sensing areas all of which are responsive to incident illumination from a subject and provide electronic information signals corresponding to the intensity of the illumination incident thereto. Means are also provided for storing the electronic information signal. Control means operate to implement a first exposure interval under a first select set of exposure defining parameters in which the image sensing array is exposed to incident illumination. The electronic information signal derived during the first exposure interval is transferred from the image sensing array to the storing means. The control means thereafter operate to implement a second succeeding exposure interval during which the image sensing array is exposed to incident illumination under a second select set of exposure defining parameters substantially different from the first set of exposure defining parameters. The control means thereafter selectively chooses between the electronic information signal derived during the first exposure interval and the electronic information signal derived during the second exposure interval to provide an output electronic information signal from which a visible image of the subject may be constructed. The control means comprises means for defining an aperture through which the subject illumination is transmitted to the image sensing array and means for timing the duration of the first and second exposure intervals. The first and second select set of exposure defining parameters may comprise either the size of the aperture or the duration of the exposure intervals. The camera may also be of the type suitable for use with an electronic flash wherein the control means includes means responsive to the manual actuation thereof for actuating the flash to provide a flash of artificial illumination during the second exposure interval.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIGS. 2A-2D show various control signals for the electronic imaging camera of FIG. 1;

FIGS. 4A-4E show various control signals for a different mode of operation for the electronic imaging camera of FIG. 1.

DESCRIPTION OF THE PREFERRED EMBODIMENT

Figure 1:
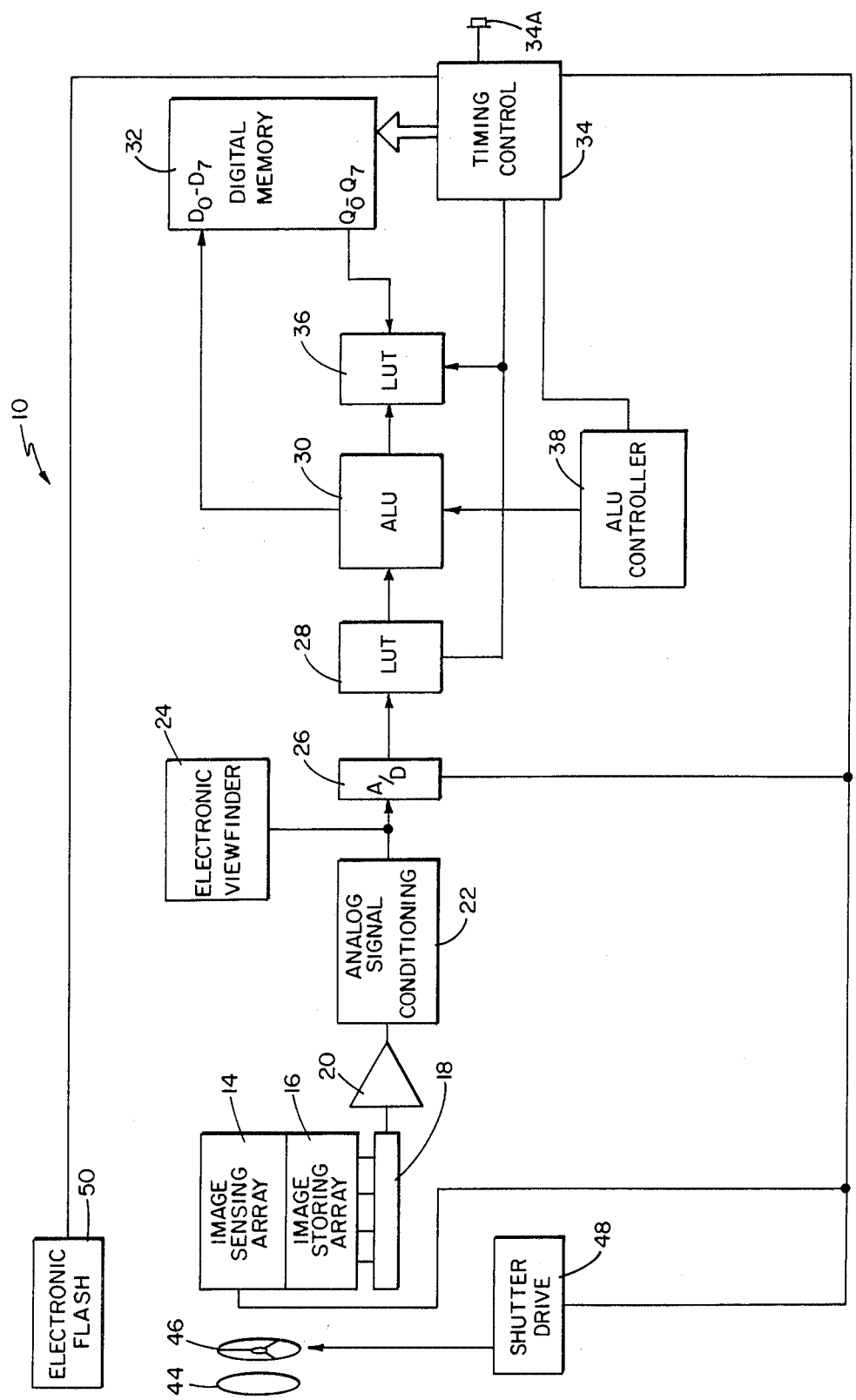
FIG. 1 is a schematic block diagram of the electronic imaging camera, of this invention.

Referring now to FIG. 1, there is shown at 10 a block diagram for the electronic imaging camera of this invention comprising an objective lens 44 for directing scene light by way of a shutter 46 to an image sensing array 14. The shutter 46 is controlled by way of a shutter drive 48 which may comprise any conventional means for opening and closing the shutter 46. The image sensing array 14 preferably comprises a predetermined number of discrete image sensing areas or pixels arranged in a two-dimensional array in which the image sensing areas respond to incident illumination to provide an electronic information signal corresponding to the intensity of the incident illumination. An image storing array 16 comprises a predetermined number of discrete image storing areas arranged in a two-dimensional array for receiving and storing the electronic information signal received directly from the image sensing array. The image sensing array 14 and image storing array 16 preferably comprise a charge coupled device (CCD) of the frame transfer type although other devices of well known architecture could also be used.

The electronic information signal is transferred out of the image storing array 16 by way of a serial shift register 18 to an analog signal conditioning circuit 22 by way of a preamplifier 20. The analog signal conditioning circuit 22 provides video processing such as gamma correction, gain control for amplifying signals detected under various light levels, and light color balance. The output electronic information signal from the analog conditioning circuit 22 is in analog format and thereafter directed to an electronic viewfinder 24 which may include a CRT to provide a continuous video display of the scene to enable the camera user to frame and compose a selected scene which he desires to record as a still image.

The output signal from the analog conditioning circuit 22 is also directed to an analog-to-digital converter 26 wherein the analog format of the electronic information signal is converted in a well-known manner to a digital format. The output from the analog-to-digital converter 26 is directed to a look-up table 28 which transforms the input signal in the manner of this invention to be subsequently described to provide an output signal to a programmable arithmetic logic unit 30. The output terminal from the arithmetic logic unit 30, in turn, connects to the input terminal ($D_0$–$D_7$) of a digital record memory 32. The output terminal from the digital record memory ($Q_0$–$Q_7$), in turn, connects to the input of another look-up table 36 whose output terminal, in turn, connects to the arithmetic logic unit 30. The arithmetic logic unit 30, in turn, is controlled by a controller 38 in a manner to be subsequently described. A timing control circuit 34 operates in a manner also to be subsequently described to provide all the timing functions. The electronic camera also comprises an electronic flash 50 for providing a flash of artificial illumination under conditions of both low ambient scene light intensity where the scene is illuminated primarily by the artificial scene light and under conditions of high ambient scene light intensity where the electronic flash 50 provides a fill flash of artificial illumination.

Operation of the electronic imaging camera 10 of this invention proceeds as follows. The camera is first operated in a viewing mode wherein the viewer views a moving video image of the scene to be recorded on the electronic viewfinder 24 so as to enable him to frame and compose a selected scene of which he desires to record a still image. During this viewing mode of operation, the shutter 46 is opened by the shutter drive 48 under the control of the timing control circuit 34 to admit scene light to the image sensing array 14. The incident illumination is integrated by the image sensing array 14 at a conventional video frame rate of 1/60th of a second. Thus, the image sensing array 14 provides an electronic information signal corresponding to an image of a scene during each of a plurality of succeeding exposure intervals as shown in FIG. 2A. The electronic information signals A and B as shown graphically in FIG. 2A are transferred from the image sensing array 14 to the image storing array 16 at the end of each exposure interval during respective vertical blanking intervals. Since the image sensing and storing arrays 14 and 16 are preferably parts of a frame transfer device, the electronic information signal sensed by the image sensing array 14 and representing approximately 244 lines of image data is transferred to the image storing array 16 during the vertical blanking interval which may be in the order of 1.5 milliseconds. As is now readily apparent, the frame transfer timing control is provided in accordance with the timing control signal of FIG. 2A from the timing control circuit 34.

The electronic information signal stored in the image storing array 16 is thereafter transferred one line at a time by the serial shift register 18 in accordance with the timing control signal of FIG. 2B during the next succeeding exposure interval to the electronic viewfinder 24 by way of the preamplifier 20 and analog signal conditioning circuit 22. Thus, for each exposure interval that the image sensing array 14 is integrating scene light to provide an electronic information signal, the electronic viewfinder 24 is displaying the image of the scene sensed by the image sensing array 14 in the immediately preceding exposure interval. During this preview mode of operation, the timing control circuit 34 operates to disable the analog-to-digital converter 26 from transmitting the electronic information signal.

In the event that the camera user sees a scene which he desires to record as a still image, he may actuate a manual actuator as shown at 34A to initiate the timing control functions of the timing control circuit 34 to be herein described. Referring now to FIG. 2C there is shown the record command pulse which occurs in response to the manual actuation of the actuator 34A to record a still image. As is now readily apparent, the record command pulse of FIG. 2C likely occurs during the exposure interval during which the image storing array 16 is serially transferring a video frame of image data as shown at A in FIG. 2B by way of the serial shift register 18. The video frame of image data A was previously transferred to the image storing array 16 from the image sensing array 14 during the immediately preceding vertical blanking interval A as shown in FIG. 2A.

The timing control 34 does not respond immediately to the record command pulse signal of FIG. 2C but instead allows for the completion of the serial line transfer of the frame of image data A from the image storing array 16 to the electronic viewfinder 24. The image sensing array 14 is also allowed to complete its integration of incident scene light to provide an electronic information signal B which is frame transferred to the image storing array 16 during the next succeeding vertical blanking interval as shown in FIG. 2A. After the electronic information signal B is transferred to the image storing array 16 during the vertical blanking interval B, the timing control circuit 34 operates to implement a second succeeding exposure interval in which the exposure defining parameters are substantially changed from that of the immediately preceding first exposure interval during which the electronic information signal B was derived. For instance, either the lens 44 aperture or exposure interval or both may be changed during the second succeeding exposure interval to effect an increase in the dynamic range of the electronic camera 10 in the manner of this invention. In addition to varying the lens aperture and/or exposure interval, the electronic flash 50 may also be fired to provide a flash of artificial illumination as shown in FIG. 4D for reasons which will become apparent from the following discussion. For the first example, however, it is assumed that the timing control 34 operates to increase only the duration of the second succeeding exposure interval in FIG. 2A to effectively increase the dynamic range of the image sensing arrray 14. Although this example is described in regard to increasing the duration of the second succeeding exposure interval, it will be readily understood that the aperture of the lens 44 could also be increased instead of the exposure interval or that both the exposure interval and the aperture could be increased together.

The image sensing array 14 thereafter integrates the scene light for the extended second exposure interval during which time the timing control circuit 34 operates to effect the serial transfer of the electronic information signal B from the image storing array 16 by way of the serial shift register 18 as shown in FIG. 2B. The timing control 34 thereafter signals the shutter drive 48 to close the shutter 46 as shown graphically in FIG. 2D thus terminating the second exposure interval. The electronic information signal integrated by the image sensing array 14 during the second exposure interval as illustrated graphically at C in FIG. 2A is thereafter line transferred from the image sensing array 14 to the image storing array 16 at the same line transfer rate at which the preceding frame of image data B was line transferred out of the image storing array 16 by the serial shift register 18.

The video frame of image data B is directed by way of the preamplifier 20 and analog signal conditioning circuit 22 to the analog-to-digital converter 26 which is enabled by the timing control circuit 34 to convert the analog format of the electronic information signal to a digital format. The digital format preferably comprises 8 bits for each picture sensing element or pixel. The electronic information signal output from the analog-to-digital converter 26, in turn, is directed to the look-up table 28 which is controlled by the timing control 34 to impose a unity transfer function (one to one) to the input signal. Thus, the output signal from the look-up table 28 is identical to the input signal and thereafter transferred to the arithmetic logic unit 30. The arithmetic logic unit 30, in turn, is programmed by its controller 38 to also impose a unity transfer function to the electronic information signal received from the look-up table 28. Thus, the arithmetic logic unit 30 transmits the electronic information signal corresponding to the video frame of image data B for storage in the digital memory 32.

After the electronic information signal for the video frame of image data B is line transferred in the aforementioned manner from the image storing array 16 to the digital memory 32, the electronic information signal derived by the image sensing array 14 during the second exposure interval is thereafter transferred at the same line transfer rate to the image storing array 16. Thus, after the digital memory 32 is loaded with the electronic information signal corresponding to the video frame of image data B, i.e., first exposure interval, the image storing array 16 is loaded with the electronic information signal for the second succeeding exposure interval corresponding to the video frame of image data C.

The timing control 34 thereafter operates to line transfer the electronic signal information corresponding to the video frame of image data C from the image storing array 16 by way of the serial shift register 18. The electronic information signal is thereafter directed by way of the preamp 20 and analog signal conditioning circuit 22 to the analog-to-digital converter 26 for conversion from an analog to a digital format. The digitized electronic information signal is thereafter directed to the input terminal of the look-up table 28. The timing control circuit 34, in turn, operates to change the transfer function of the look-up table 28 from unity to that as shown at 28' in FIG. 3B. Simultaneously, the timing control circuit 34 operates to line transfer the electronic information signal stored in the digital memory 32 to the input terminal of the look-up table 36 which is controlled by the timing control 34 to impose a transfer function as shown at 36' in FIG. 3B. The arithmetic logic unit 30 is programmed by the controller 38 to add the output electronic information signals from the look-up tables 28 and 36 to provide an output electronic information signal that is directed back to the digital memory 32 for storage therein.

Figure 3B:
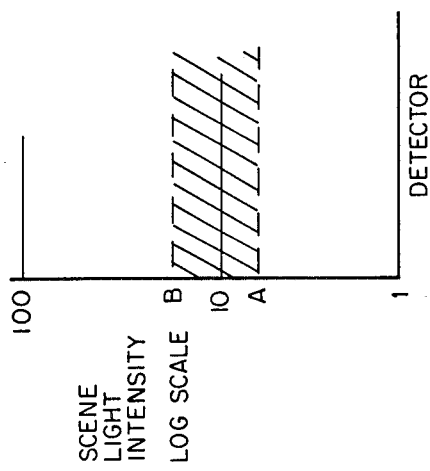
FIGS. 3A and 3B show, respectively, the response characteristics for the light detector and look-up tables in the electronic imaging camera of this invention.

Referring now to the transfer functions of FIG. 3B for the look-up tables 28 and 36, it can be seen that the look-up table 28 provides a unity transfer function for the electronic information signal corresponding to the video frame of image data C derived during the second exposure interval immediately succeeding the 1/60 of a second first exposure interval. Whereas the second exposure interval is of relatively long duration in comparison to the first exposure interval, moderate to high scene light intensity levels such as, for example, those occurring above level B as shown in the graph of FIG.

3A operate to drive the individual image sensing elements of the CCD array 14 into saturation while only relatively low scene light intensity levels such as those shown below level A in the graph of FIG. 3A can be adequately sensed. For scene light intensity levels in the intermediate range between levels A and B of the graph of FIG. 3A, the output signal from the image sensing array 14 incurs a progressively increasing degree of signal distortion up to the scene light intensity level B where the output becomes indiscernible as a result of the image sensing array 14 saturating. Thus, it can be seen that the transfer function 28' for the look-up table 28 operates to provide a unity transfer function for the output electronic information signal corresponding to the video frame of image data C derived during the aforementioned second exposure interval in which scene light intensity levels may be adequately sensed in the ranges shown from 1 to A in the graph of FIG. 3A. For scene light intensity levels greater than A, the transfer function 28' for the look-up table 28 gradually decreases to 0 before the image sensing array 14 saturates. As will be readily understood, the scene light intensity levels 1 to 100 are shown on a log scale only as one example to illustrate the limited exposure sensitivity of the image sensing array 14 and may vary substantially for other exposure arrays.

Figure 3A:
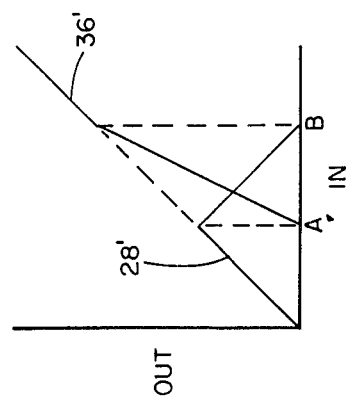

Conversely, the image sensing array 14 operates to provide accurate analog output electronic information signal values during the first shorter exposure interval for scene light intensity levels between B and 100 as shown in the graph of FIG. 3A. For scene light intensity levels within the intermediate range between B and A of the graph of FIG. 3A the output signal from the image sensing array 14 becomes progressively noisier until being indiscernible for scene light intensity levels below level A in FIG. 3A. Thus, the transfer function 36' for the look-up table 36 operates to progressively transfer more of the electronic information signal corresponding to the video frame of image data B derived during the shorter first 1/60th of a second first exposure interval immediately preceeding the longer second first exposure interval between the intermediate scene light intensity levels A and B. As is readily apparent, the look-up table 36 operates to provide a unity transfer function for the electronic information signals corresponding to the video frame of image data B derived during the first exposure interval for those scene light intensity levels above level B.

The arithmetic logic unit 30 is programmed by its controller 38 to add the input electronic information signals from the look-up tables 28 and 36, respectively, to provide an output electronic information signal for storage in the digital memory 32 in which scene light intensity levels for the entire range of scene light intensity levels from 1 to 100 as shown in the graph of FIG. 3A are digitally recorded. In this manner there is provided an electronic imaging camera in which image data over a broad range of scene light intensity levels may be recorded regardless of the more limited dynamic range of the image sensing array. Thus, by selectively combining the image data derived during two succeeding exposure intervals having different exposure controlling parameters the dynamic range of the image sensing array can be effectively extended.

Alternatively, it may also be desirable to provide an electronic flash of artificial illumination during the second exposure interval as may be accomplished in the following manner. After the electronic information signal B is transferred to the image storing array 16 during the vertical blanking interval B as previously discussed, the timing control 34 operates to provide a flash fire signal to the electronic flash 50 so as to trigger the electronic flash and provide a flash of artificial illumination as shown in FIG. 4D. Again, the timing control circuit 34 operates simultaneously to effect the serial transfer of the electronic information signal B from the image storing array 16 by way of the serial shift register 18 as shown in FIG. 4B as previously discussed. The image sensing array 14 thereafter integrates the artificially illuminated scene light for a determined exposure interval whereupon the timing control 34 signals the shutter drive 48 to close the shutter 46 as shown graphically in FIG. 4E. Once the shutter 46 is closed, the timing control circuit 34 operates to commence the line transfer of the video frame of image data B from the image storing array 16 by way of the serial shift register 18 as shown in FIG. 2B. Simultaneously the electronic information signal integrated by the image sensing array 14 during the second exposure interval where the electronic flash of artificial illumination is fired as illustrated graphically at C in FIG. 4A is line transferred from the image sensing array 14 to the image storing array 16 at the same line transfer rate at which the preceding frame of image data B was line transferred out of the image storing array 16 by the serial shift register 18.

The video frame of image data B is directed by way of the preamplifier 20 and analog signal conditioning circuit 22 to the analog-to-digital converter 26 which is enabled by the timing control circuit 34 to convert the analog format of the electronic information signal to a digital format as previously discussed. The electronic information signal output from the analog-to-digital converter 26, in turn, is again directed to the look-up table 28 which imposes a unity transfer function on the electronic information signal so as to transmit the electronic information signal by way of the arithmetic logic unit 30 to the input terminal of the digital memory 32 as previously discussed.

In this manner the electronic information signal corresponding to the video frame of image data B is transferred for storage in the digital memory 32. The electronic information signal derived by the image sensing array 14 during the second exposure in which the flash of artificial illumination is fired is thereafter transferred at the same line transfer rate to the image storing array 16. Thus, after the digital memory 32 is loaded with the electronic information signal corresponding to the video frame of image data B, the image storing array 16 is loaded with the electronic information signal corresponding to the video frame of image data C as previously discussed.

The timing control 34 thereafter operates to line transfer the electronic signal information corresponding to the video frame of image data C from the image storing array 16 by way of the serial shift register 18. The electronic information signal is thereafter directed by way of the preamp 20 and analog signal conditioning circuit 22 to the analog-to-digital converter 26 for conversion from an analog to a digital format. The digitized electronic information signal is thereafter directed to the input terminal of the look-up table 28 which still imposes a unity transfer function.

Simultaneously, the timing control circuit 34 operates to line transfer the electronic information signal stored in the digital memory 32 to the input terminal of the look-up table 36 which also imposes a unity transfer function on the electronic information signal. The outputs from both look-up tables 28 and 36 are directed simultaneously to respective input terminals of the arithmetic logic unit 30 which for this example is controlled by the controller 38 to operate in the manner of a digital comparator with associated circuitry for transmitting the higher of the compared digital signals. The arithmetic logic unit 30 thus operates to compare the electronic information signal integrated during a second exposure interval in which the flash of artificial illumination is provided, with the electronic information signal integrated during the immediately preceding first exposure interval, to provide an output corresponding to the greater of the compared electronic information signals. The output electronic information signal from the arithmetic logic unit 30 is thereafter directed for storage in the aforementioned manner in the digital memory. Thus, in this manner those electronic information signals corresponding to the greater exposure are recorded in order to provide the optimum exposure of subjects in both the foreground and background of the scene.

Subjects in the foreground of the scene may not be adequately exposed without artificial illumination even under conditions of high ambient scene light intensity particularly in situations where the scene is backlit. Thus, the source of artificial illumination operates to adequately expose near subjects even under conditions of high ambient scene light intensity. However, since the exposure interval during a flash of artificial illumination may be substantially shorter than the preceding exposure interval which occurs at conventional video frame rates of 1/60th of a second, it may not be possible to adequately expose the background of the scene. Since the exposure interval immediately preceding the flash of artificial illumination is a standard 1/60th of a second video frame which is substantially longer than the exposure interval determined by the duration of the flash of artificial illumination, there is provided image data for an adequately exposed background which may then be compared to the image data corresponding to the best exposed foreground so as to ultimately provide image data corresponding to the best exposure values for both the foreground and background of the scene.

It will be readily understood that for both of the aforementioned examples where one of the exposure controlling parameters such as the exposure interval, aperture size, or flash of artificial illumination are either modified or provided, respectively, in the second succeeding exposure interval, the transfer functions imposed by the look-up tables 28 and 26 may be further modified to provide image enhancing algorithms to be imposed upon the electronic information signals transferred therethrough. Thus, the look-up tables 28 and 36 may comprise substantially more complex transfer functions than those described above when adjusting the input electronic information signals to accommodate the parameters of specific films upon which the recorded images may ultimately be recorded to provide hard copy. In addition, the arithmetic logic unit 30 may comprise functions of two variables more general than simple addition.

Other embodiments of the invention, including additions, subtractions, deletions and other modifications of the preferred disclosed embodiments of the invention will be obvious to those skilled in the art and are within the scope of the following claims.

What is claimed is:

1. An electronic imaging camera comprising:
   an image sensing array comprising a predetermined number of discrete image sensing areas all of which are responsive to incident illumination from a subject to provide an electronic information signal corresponding to the intensity of the illumination incident thereto;
   means for storing the electronic information signal; and
   control means for controlling a first select set of exposure defining parameters to implement a first exposure interval during which said image sensing array is exposed to incident illumination; transferring said electronic information signal derived during said first exposure interval from said image sensing array to said storing means; controlling a second select set of exposure defining parameters substantially different from said first set of exposure defining parameters to implement a second succeeding exposure interval during which said image sensing array is exposed to incident illumination, subsequently transferring said electronic information signal derived during said second exposure interval from said image sensing array, and selectively combining said electronic information signal derived during said first exposure interval and said electronic information signal derived during said second exposure interval to provide an output electronic information signal comprising a first selected component of said electronic information signal derived during said first exposure interval and a second selected component of said electronic information signal derived during said second exposure interval from which a visible image of the subject may be constructed.

2. The electronic imaging camera of claim 1 wherein said control means comprises means for defining an aperture through which subject illumination is transmitted to said image sensing array and means for timing the duration of said first and second exposure intervals wherein said first and second select set of exposure defining parameters comprise either the size of said aperture or the duration of said exposure interval.

3. The electronic imaging camera of claim 1 wherein said camera is of the type suitable for use with an electronic flash and said control means includes means responsive to the manual actuation thereof by actuating the flash to provide a flash of artificial illumination during said second exposure interval.

4. The camera of claim 1 wherein said means for storing electronic information signals includes an image storing array comprising a predetermined number of discrete image storing areas corresponding to said discrete image sensing areas for storing said electronic information signal received directly from said image sensing array and a record memory for storing said output electronic information signal from which a visible image of the subject may be reconstructed.

5. The camera of claim 4 wherein said image sensing array and said image storing array comprise a two dimensional charge coupled device of the frame transfer type.

6. The camera of claim 4 wherein said means for selectively combining includes a first look-up table for selectively transforming said electronic information signal derived during said first exposure interval, a second look-up table for selectively transforming said electronic information signal derived during said second exposure interval, and a programmable arithmetic logic unit for providing said output electronic information signal representative of a selectively programmed combination of the transformed signals from said first and second look-up tables; said control means also responding to the manual actuation thereof to record a still image by transferring the electronic information signal derived during said first exposure interval from the image storing array to said record memory for storage therein, subsequently transferring the electronic signal information derived during said first exposure interval from said record memory and the electronic information signal derived during said second exposure interval to said programmable arithmetic logic unit and thereafter transferring said output electronic information signal from said programmable arithmetic logic unit to said record memory for storage therein.

7. The camera of claim 6 wherein the electronic information signal is stored in analog format by said image storing array, and means are provided for converting the analog format of the electronic information signal to a digital format prior to transfer to said first look-up table thereby resulting in the electronic information signal being stored in digital format by said record memory.

8. A method for sensing a subject and providing an output electronic information signal from which a visible image of the subject may be constructed comprising the steps of:
sensing light from the subject to provide a first electronic information signal corresponding to the subject so sensed during a first exposure interval defined by a first select set of exposure parameters;
storing said first electronic information signal derived during said first exposure interval;
sensing light from the subject to provide a second electronic information signal corresponding to the subject so sensed during a second exposure interval succeeding said first exposure interval and defined by a second select set of exposure parameters substantially different from said first set of exposure parameters; and
selectively combining said first and second electronic information signals to provide an output electronic information signal comprising a first selected component of said first electronic information signal and a second selected component of said second electronic information signal from which a visible image of the subject may be constructed.

9. The method of claim 8 wherein said first and second set of exposure defining parameters comprise either the size of the aperture through which the light from the subject is sensed or the duration of the exposure intervals.

10. The method of claim 8 including the step of firing a flash of artificial illumination during said second exposure interval.

11. The method of claim 8 wherein the light from the subject is sensed with a two dimensional image sensing array and thereafter stored in a two dimensional image storing array; and the selectively combined electronic information signals are stored in a record memory.

12. The method of claim 11 further comprising the steps of:
transferring said first electronic information signal stored in the storage array by way of a first look-up table to the record memory;
transferring said first electronic information signal from said record memory by way of a second look-up table to a programmable arithmetic logic unit;
simultaneously transferring said second electronic information signal by way of said first look-up table to said programmable arithmetic logic unit so as to combine said first and second electronic information signals to provide said output electronic information signal for storage in said record memory.

13. A method for sensing and recording a selected still image comprising the steps of:
sensing scene light with an image sensing array to provide an electronic information signal corresponding to an image of a scene during each of a plurality of succeeding exposure intervals;
transferring the electronic information signal from the image sensing array to an image storing array at the end of each exposure interval during each of a plurality of respective vertical blanking intervals;
transferring the electronic information signal out of said image storing array during each of the plurality of exposure intervals succeeding, respectively, each of the plurality of vertical blanking intervals during which the electronic information signals are transferred into the image storing array;
continuing to transfer the electronic information signal out of said image storing array for the remainder of the exposure interval in which a selective manual actuation is provided to designate a scene of which a still image is to be recorded;
transferring the electronic information signal out of the image sensing array to the image storing array during the vertical blanking interval at the end of the exposure interval during which the selective manual actuation is made;
readjusting the exposure defining parameters at the commencement of the next succeeding exposure interval;
transferring the electronic information signal stored in the image storing array to a record memory and the electronic information signal derived by the image sensing array during said readjusted exposure interval to the image storing array;
combining the electronic information signal stored in the image storing array with the electronic information signal stored in the record memory to provide an output electronic information signal comprising a first selected component of the electronic information signal stored in the image storing array and a second selected component of the electronic information signal stored in the record memory; and
storing in the record memory said output electronic information signal.

14. The method of claim 13 comprising the additional step of:
directing the electronic information signal transferred from said image storing array during each of the plurality of exposure intervals succeeding, respectively, each of the plurality of vertical blanking intervals to an electronic viewfinder display.

15. The method of claim 13 wherein said electronic information signal is originally in analog format and said method includes the further step of converting the analog format of said electronic information signal to a digital format prior to its transfer to the record memory and prior to its combination with the electronic information signal stored in said record memory.

16. The method of claim 13 including the step of firing a flash of artificial illumination at the commencement of the exposure interval in which the exposure defining parameters are readjusted.

17. An electronic imaging camera of the type suitable for use with an electronic flash comprising:
   an image sensing array comprising a predetermined number of discrete image sensing areas all of which are responsive to incident lumination to provide an electronic information signal corresponding to the intensity of the illumination incident thereto;
   an image storing array comprising a predetermined number of discrete image storing areas corresponding to said discrete image sensing areas for storing the electronic information signal received directly from said image sensing array;
   memory means for recording the electronic information signal corresponding to a selected still image; and
   control means for controlling said scene light sensing array to provide the electronic information signal corresponding to an image of a scene during each of a plurality of succeeding exposure intervals, controlling the transer of the electronic information signal from said image sensing array to said image storing array at the end of each exposure interval during each of a plurality of respective vertical blanking intervals, controlling the transfer of the electronic information signal out of said image storing array during each of the plurality of exposure intervals succeeding, respectively, each of the plurality of vertical blanking intervals during which each electronic information signal is transferred to said image storing array, said control means responding to the selective manual actuation thereof to designate a scene of which a still image is to be recorded, by controlling the continued transfer of the electronic information signal out of said image storing array for the remainder of the exposure interval during which the selective manual actuation is made, controlling the transfer of the electronic information signal out of the image sensing array during the vertical blanking interval at the end of the exposure interval during which the selective manual actuation is made, controlling a change in the exposure defining parameters at the commencement of the next succeeding exposure interval, thereafter controlling the transfer of the electronic information signal stored in said image storing array to said memory means and the electronic information signal derived by said image sensing array to said image storing array, thereafter controlling the combining of the electronic information signal stored in said image storing array with the electronic information signal stored in said memory means to provide a combined electronic information signal comprising a first selected component of the electronic information signal stored in said image storing array and a second selected component of the electronic information signal stored in said memory means, and lastly controlling the transfer of said combined electronic information signal to said memory means.

18. The camera of claim 17 for use with a flash of artificial illumination wherein said control means operates to fire the flash of artificial illumination during said changed exposure interval.

19. The camera of claim 17 wherein said image sensing array and said image storing array comprise a two dimensional charge coupled device of the frame transfer type.

20. The camera of claim 17 wherein said control means comprises: a programmable arithmetic logic unit for combining the electronic information signal derived during said changed exposure interval with the electronic information signal stored in said memory means to provide an output electronic information signal representative of the combination of the input signals; a first look-up table having an input terminal connected to receive the electronic information signal from said image storing array and an output terminal connected to one input of the programmable arithmetic logic unit and a second look-up table having an output terminal connected to receive the electronic information signal from said memory means and an output terminal connected to another input of the programmable arithmetic logic unit wherein the electronic information is transferred to said memory means during the vertical blanking interval at the end of the exposure interval during which the selective manual actuation occurs by way of said first look-up table and programmable arithmetic logic unit.

21. The camera of claim 20 further comprising an electronic viewfinder display wherein said control means operates to transfer the electronic information signal transferred from said image storing array during each of the plurality of exposure intervals succeeding, respectively, each of the plurality of vertical blanking intervals to said electronic viewfinder display.

22. The camera of claim 20 wherein said electronic information signal is originally in analog format and there is further included an analog-to-digital converter for converting the analog format of said electronic information signal to a digital format prior to its transfer to said memory means and said programmable arithmetic logic unit.

* * * * *